US006794995B2

(12) United States Patent
Shimada (10) Patent No.: US 6,794,995 B2
(45) Date of Patent: Sep. 21, 2004

(54) INFORMATION REPRODUCING APPARATUS, INFORMATION REPRODUCING METHOD, INFORMATION RECORDING MEDIUM, INFORMATION RECORDING APPARATUS, INFORMATION RECORDING METHOD, AND INFORMATION RECORDING PROGRAM

(75) Inventor: Hiroshi Shimada, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/125,373

(22) Filed: Apr. 19, 2002

(65) Prior Publication Data

US 2002/0154900 A1 Oct. 24, 2002

(30) Foreign Application Priority Data

Apr. 20, 2001 (JP) .................................... 2001-122897

(51) Int. Cl.[7] .......................... H03M 7/00; H04N 7/12; H04N 11/02; H04N 11/04
(52) U.S. Cl. ...................................... 341/50; 348/423.1
(58) Field of Search ............................. 341/50; 345/3.2, 345/501, 503, 522; 348/14.08, 423.1, 441, 731; 386/46, 54, 39, 68, 70, 95, 125; 725/18; 463/29, 31, 32, 36; 709/219, 246

(56) References Cited

U.S. PATENT DOCUMENTS 4,963,995 A * 10/1990 Lang ............................ 386/54
5,675,693 A * 10/1997 Kagoshima .................... 386/68
5,919,249 A *  7/1999 Herbstman et al. ......... 709/246
5,995,705 A * 11/1999 Lang ............................ 386/46
5,999,220 A * 12/1999 Washino ..................... 348/441
6,222,591 B1 *  4/2001 Van Zon et al. ............ 348/553
6,326,935 B1 * 12/2001 Boger ........................ 345/3.2
6,369,855 B1 *  4/2002 Chauvel et al. .......... 348/423.1
6,480,537 B1 * 11/2002 Agrawal et al. ............ 375/240
6,483,553 B1 * 11/2002 Jung ......................... 348/731
6,570,926 B1 *  5/2003 Agrawal et al. ....... 375/240.27

FOREIGN PATENT DOCUMENTS

JP            11-167400          6/1999
JP          2000-013237          1/2000

* cited by examiner

Primary Examiner—Patrick Wamsley
(74) Attorney, Agent, or Firm—Oblon, Spivak, McClelland, Maier & Neustadt, P.C.

(57) ABSTRACT

An apparatus for reproducing digital information coded in a coding system, the coded digital information and a decoding program describing a decoding algorithm to decode the digital information recorded in an information recording medium, includes: a reading unit configured to read out the coded digital information and the decoding program recorded in the information recording medium; a program memory configured to store the decoding program read out from the reading unit; a signal processing unit configured to decode the digital information read out from the reading unit by the decoding algorithm of the decoding program stored in the program memory; and a conversion unit configured to convert the digital information decoded in the digital signal processing unit into a predetermined format, and to output the converted digital information.

16 Claims, 10 Drawing Sheets

INFORMATION REPRODUCING APPARATUS, INFORMATION REPRODUCING METHOD, INFORMATION RECORDING MEDIUM, INFORMATION RECORDING APPARATUS, INFORMATION RECORDING METHOD, AND INFORMATION RECORDING PROGRAM

CROSS REFERENCE TO RELATED APPLICATIONS

This application claims benefit of priority under 35 USC §119 to Japanese Patent Application No. 2001-122897 filed on Apr. 20, 2001, the entire contents of which are incorporated by reference herein.

BACKGROUND OF THE INVENTION

1. Field of the Invention

The present invention pertains to an information reproducing apparatus for reproducing digital information composed of coded signals of audio and video.

2. Description of Related Art

Various coding (data compressing) technologies have been proposed to compress data size of audio or video at high efficiency. For example, in the field of portable music players, the music player conforming to the MPEG Audio Layer 3 (MP3) system ("MPEG" is short for "Moving Picture Experts Group"), the coding system for recording a larger quantity of music signals at a higher sound quality in a semiconductor memory of a limited capacity is becoming pervasive. Besides the MP3 system, new coding systems are provided one after another such as the Advanced Audio Coding (AAC) system and the Windows Media Audio (WMA) system.

Generally, in the field of severe competition of new product development, the life cycle of products is very short. For example, when a new system is widely spread, the reproducing apparatus conforming only to the former coding system may not be applicable to the new system, and the user has to purchase a new product conforming to the new system.

In such reproducing apparatus, however, the hardware configuration is not so much different if the coding system is changed, and only the algorithm differs slightly in the portion for decoding the information.

Accordingly, a reproducing apparatus applicable to different coding systems by realizing the decoding process by decoding software and installing plural types of decoding software on a semiconductor memory mounted on the reproducing apparatus has been developed. In addition, a reproducing apparatus applicable to the new decoding technology by rewriting a coding program installed in a semiconductor memory mounted on the reproducing apparatus is also developed.

Figure 1:
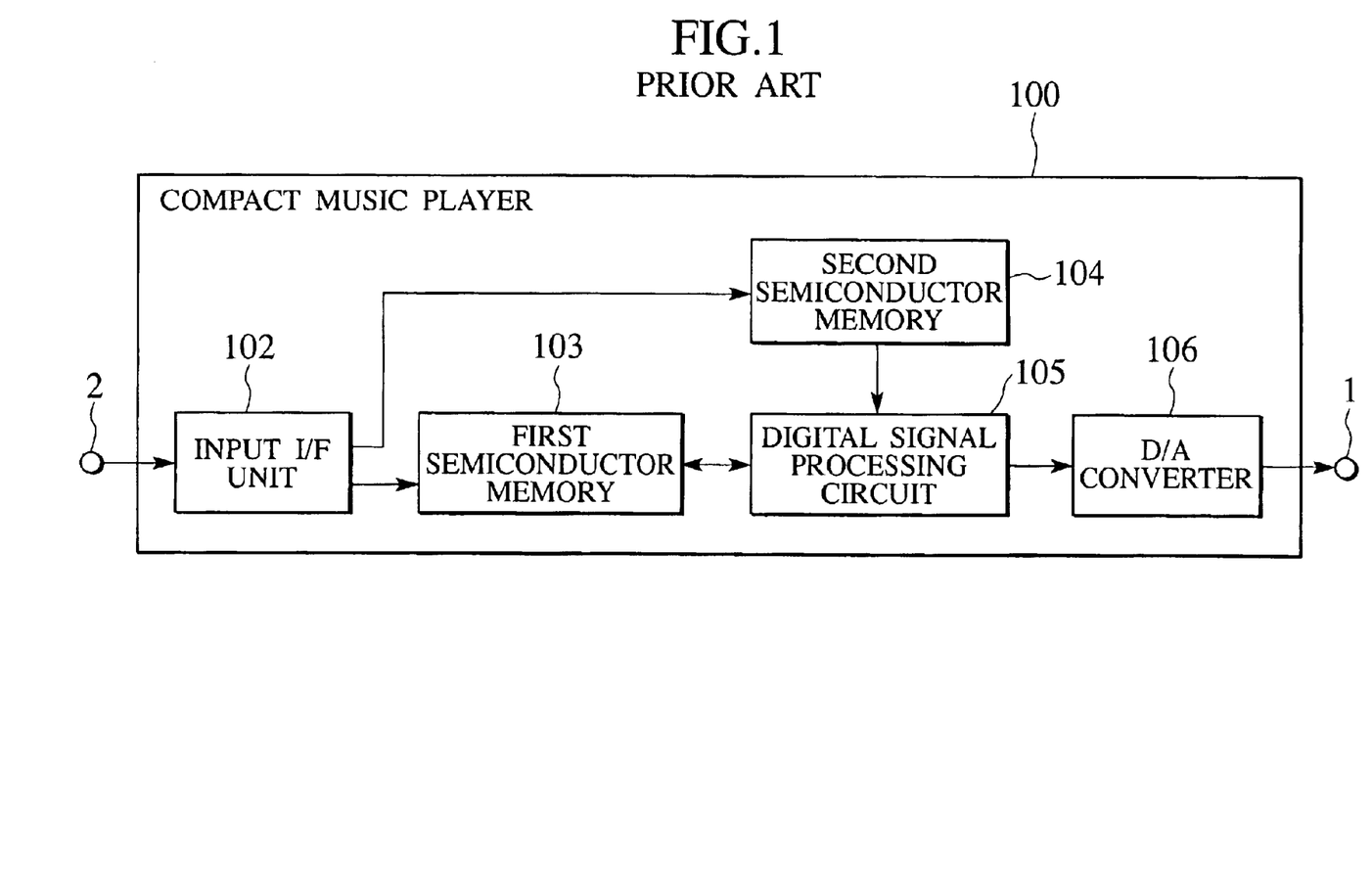
FIG. 1 is a schematic structural diagram showing an example of a typical portable music player.

A portable music player applicable to plural types of coding systems is disclosed, for example, in Japanese Patent Laid-Open Publication (Kokai) No. H11-167400. FIG. 1 is a functional block diagram showing a schematic configuration of a compact music player 100 disclosed in this publication.

As shown in FIG. 1, the compact music player 100 has an input I/F unit 102, a first semiconductor memory 103, a second semiconductor memory 104, a digital signal processing circuit 105, and a Digital to Analog (D/A) converter 106. In the input interface (I/F) unit 102, audio digital data coded by using a predetermined audio coding technology is inputted. In the first semiconductor memory 103, audio digital data inputted from the input I/F unit 102 is stored. In the second semiconductor memory 104, a decoding program inputted from the input I/F unit 102 to decode in reverse process of coding is stored. The digital signal processing circuit 105 decodes the audio digital data stored in the first semiconductor memory 103 by the decoding program stored in the second semiconductor memory 104. The D/A converter 106 converts the output signal from the digital signal processing circuit 105 into an analog signal.

According to the compact music player 100, using the decoding program, stored in the second semiconductor memory 104, corresponding to the audio digital data stored in the first semiconductor memory 103, the audio digital data stored in the first semiconductor memory 103 is decoded. Therefore, music can be reproduced from the audio digital data regardless of the compression coding system of audio digital data stored in the first semiconductor memory 103.

In the compact music player 100, whole or part of the second semiconductor memory 104 is composed of a programmable flash memory. Accordingly, if the corresponding decoding program is not written preliminarily in the second semiconductor memory 104, a new decoding program can be stored by updating the content of the second semiconductor memory 104, so that music signals corresponding to various compression decoding systems can be reproduced.

In addition, in the compact music player 100, plural types of decoding processing programs are installed on the second semiconductor memory 104. Based on the information about the coding process added to each music digital signal, a decoding process program corresponding to the compression coding system can be selected from the plural types of decoding process programs, and decoding is processed, so that music signals corresponding to various compression coding systems can be reproduced.

In such reproducing apparatus, however, to be applicable to plural types of coding systems, a sufficient capacity must be kept in the semiconductor memory to install plural types of decoding program. However, the programmable and nonvolatile semiconductor memories such as flash memories are expensive, and if a flash memory of a large capacity is incorporated, it adds to the cost of the reproducing apparatus.

Although the semiconductor memory storing the decoding programs stores plural types of decoding programs by increasing its capacity, only one of decoding programs corresponding to the coding system of the music digital data is used while actually reproducing the music digital data. Therefore, it is not an efficient manner in the use of the expensive semiconductor memory.

Moreover, in order to suppress the capacity of semiconductor memory, it may be considered to store a corresponding decoding program every time to update the content of the semiconductor memory to be applicable to the plural types of decoding systems. In this method, however, in order to install a corresponding decoding program, an external device such as a personal computer is required to connect to the reproducing apparatus each time. In other words, in a place where the personal computer or other external device is not available, the corresponding decoding program cannot be installed on the reproducing apparatus. The portable music player is often used outdoors, its convenience is restricted significantly.

SUMMARY OF THE INVENTION

An apparatus for reproducing digital information coded in a coding system in an embodiment of the present invention, the coded digital information and a decoding program describing a decoding algorithm to decode the digital information recorded in an information recording medium, includes: a reading unit configured to read out the coded digital information and the decoding program recorded in the information recording medium; a program memory configured to store the decoding program read out from the reading unit; a signal processing unit configured to decode the digital information read out from the reading unit by the decoding algorithm of the decoding program stored in the program memory; and a conversion unit configured to convert the digital information decoded in the digital signal processing unit into a predetermined format, and to output the converted digital information.

An information recording medium in an embodiment of the present invention, recording digital information to be reproduced by an information reproducing apparatus configured to decode the digital information and to convert the decoded digital information into a predetermined output format, includes: a digital information file storing the digital information coded the digital information in a predetermined coding system; and a program file storing a decoding program describing a decoding algorithm to decode the coded digital information.

A method for reproducing digital information in an embodiment of the present invention includes: reading out coding information of the digital information to be reproduced from an information recording medium in which the digital information coded in a predetermined coding system and a decoding program describing a decoding algorithm to decode the coded digital signal are recorded together; reading out the decoding program corresponding to the coding information read out from the information recording medium; storing the read out decoding program to a program memory; reading out the digital information to reproduce from the information recording medium; decoding the digital information read out by the decoding algorithm of the stored decoding program; and converting the decoded digital information into a predetermined format, and reproducing the converted digital information.

An apparatus for recording digital information coded in a coding system and decoding program describing a decoding algorithm to decode the digital information in a first recording medium in an embodiment of the present invention, the decoding program and recording software to record the digital information in the first recording medium recorded in a second recording medium, includes: a first input/output unit configured to input and output of the first recording medium; a second input/output unit configured to input and output of the second recording medium; a program memory configured to store the recording software in the second recording medium through the second input/output unit; and a control unit configured to read out coding information from the digital information, to judge whether the decoding program corresponding to the coding information readout is recorded in the first recording medium through the first input/output unit, to read out the decoding program corresponding to the coding information from the second recording medium through the second input/output unit when the decoding program is not recorded in the first recording medium, to record the decoding program read out in the first recording medium through the first input/output unit, and to record the digital information in the first recording medium through the first input/output unit, according to a processing procedure predetermined in the recording software stored in the program memory.

A method of recording digital information coded in a predetermined coding system in a first recording medium, in an embodiment of the present invention, includes: reading out coding information from the digital information; judging whether decoding program corresponding to the coding information read out is recorded in the first recording medium; reading out the decoding program corresponding to the coding information from a second recording medium when the decoding program is not recorded in the first recording medium; recording the decoding program read out in the first recording medium; and recording the digital information in the first recording medium.

A computer readable recording medium storing a program for recording digital information coded in a predetermined coding system in a first recording medium, in a embodiment of the present invention, includes: reading out coding information from the digital information; judging whether decoding program corresponding to the coding information read out is recorded in the first recording medium; reading out the decoding program corresponding to the coding information from the second recording medium when the decoding program is not recorded in the first recording medium; recording the decoding program read out in the first recording medium; and recording the digital information in the first recording medium.

DETAILED DESCRIPTION

There will be explained below embodiments of the present invention with reference to the drawings. It is to be noted that the same or similar reference numerals are applied to the same or similar parts and elements throughout the drawings, and description of the same or similar parts and elements will be omitted or simplified.

First Embodiment

Figure 2:
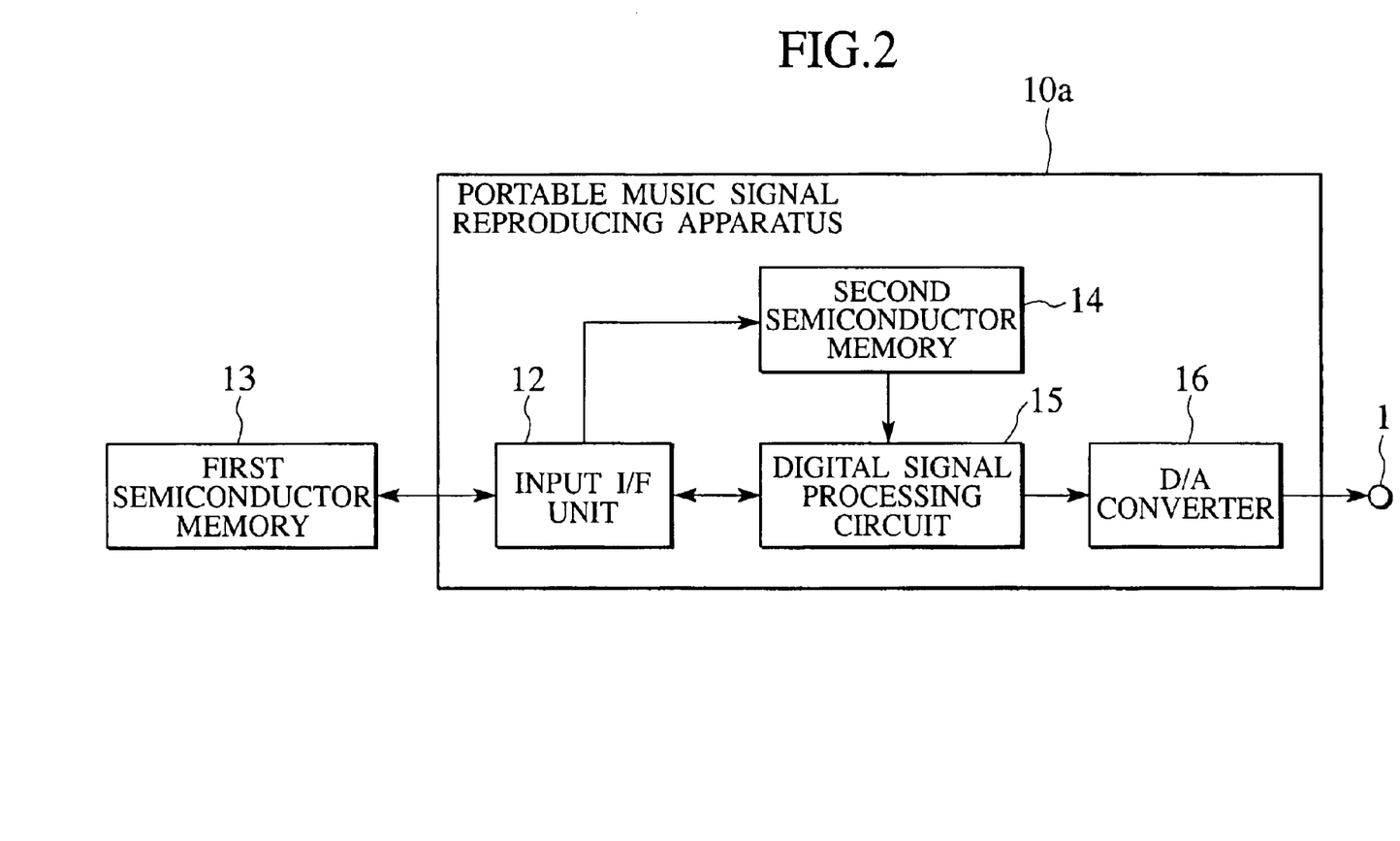
FIG. 2 is a schematic structural diagram showing an embodiment of a portable music signal reproducing apparatus as an information reproducing apparatus in a first embodiment of the invention.

As shown in FIG. 2, a portable music signal reproducing apparatus 10a, which is an information reproducing apparatus in a first embodiment, includes an input interface (I/F) unit 12, a second semiconductor memory 14, a digital signal processing circuit 15, and a Digital to Analog (D/A) converter 16. A first semiconductor memory 13 is an information recording medium recording music signal or digital information coded in a predetermined coding system and a decoding program describing a decoding algorithm to decode the coded music signal. The input I/F unit 12 is a reading unit to read out the coded music signal or the coded digital information and the decoding program recorded in the first semiconductor memory 13. The second semiconductor memory 14 is a program memory to store the decoding program read out from the input I/F unit 12. The digital signal processing circuit 15 is a signal processing unit to decode the music signal read out from the input I/F unit 12 by the decoding algorithm of the decoding program stored in the second semiconductor memory 14. The D/A converter 16 is a conversion unit to convert the music signal decoded in the digital signal processing circuit 15 into a predetermined output format.

Herein, "coding" is not limited to the so-called high efficiency coding to compress the quantity of information such as MP3, AAC or WMA. "Coding" includes, for example, coding for digitizing analog signals, coding for correcting transmission errors of digital signals, coding for private communication or security, and coding used for various other purposes.

As the first semiconductor memory 13, for example, a flash memory of removable card type such as SD memory card may be used. In the first semiconductor memory 13 mounted on the input I/F unit 12, music data coded in the predetermined coding system and the decoding program to decode coded music data are recorded. Of course, a plurality of coded music data may be recorded in the first semiconductor memory 13. Further, music data coded in different coding systems may coexist in the first semiconductor memory 13, and in such a case, decoding programs corresponding to the respective coding systems are recorded in the first semiconductor memory 13.

When reproducing the music data coded in the corresponding coding system, the decoding program stored in the first semiconductor memory 13 is read out from the input I/F unit 12, and the decoding program read out is stored in the second semiconductor memory 14. As the input I/F unit 12, for example, an interface of high compatibility with the personal computer such as Universal Serial Bus (USB) may be used.

Since the decoding program stored in the second semiconductor memory 14 can be read in each time from the first semiconductor memory 13, nonvolatile flash memory is not required in the semiconductor memory 14, and a relatively inexpensive volatile memory such as a static random access memory (SRAM) or a dynamic random access memory (DRAM) can be used. Moreover, the second semiconductor memory 14 is not required to have a large capacity to store plural decoding programs and is required to have a capacity enough to store a single decoding program only.

The coded music data stored in the first semiconductor memory 13 is read out from the input I/F unit 12, the read out coded music data is sent to the digital signal processing circuit 15 and decoded by the decoding program stored in the second semiconductor memory 14.

As the digital signal processing circuit 15, for example, a programmable operation circuit such as fixed decimal point Digital Signal Processor (DSP) may be used.

The music data decoded in the digital signal processing circuit 15 is converted into analog music signal in the D/A converter 16 and issued from an audio output terminal.

The analog music signal issued from the audio output terminal is reproduced and delivered as sounds from an external electric acoustic device 1 such as headphones.

Figure 3:
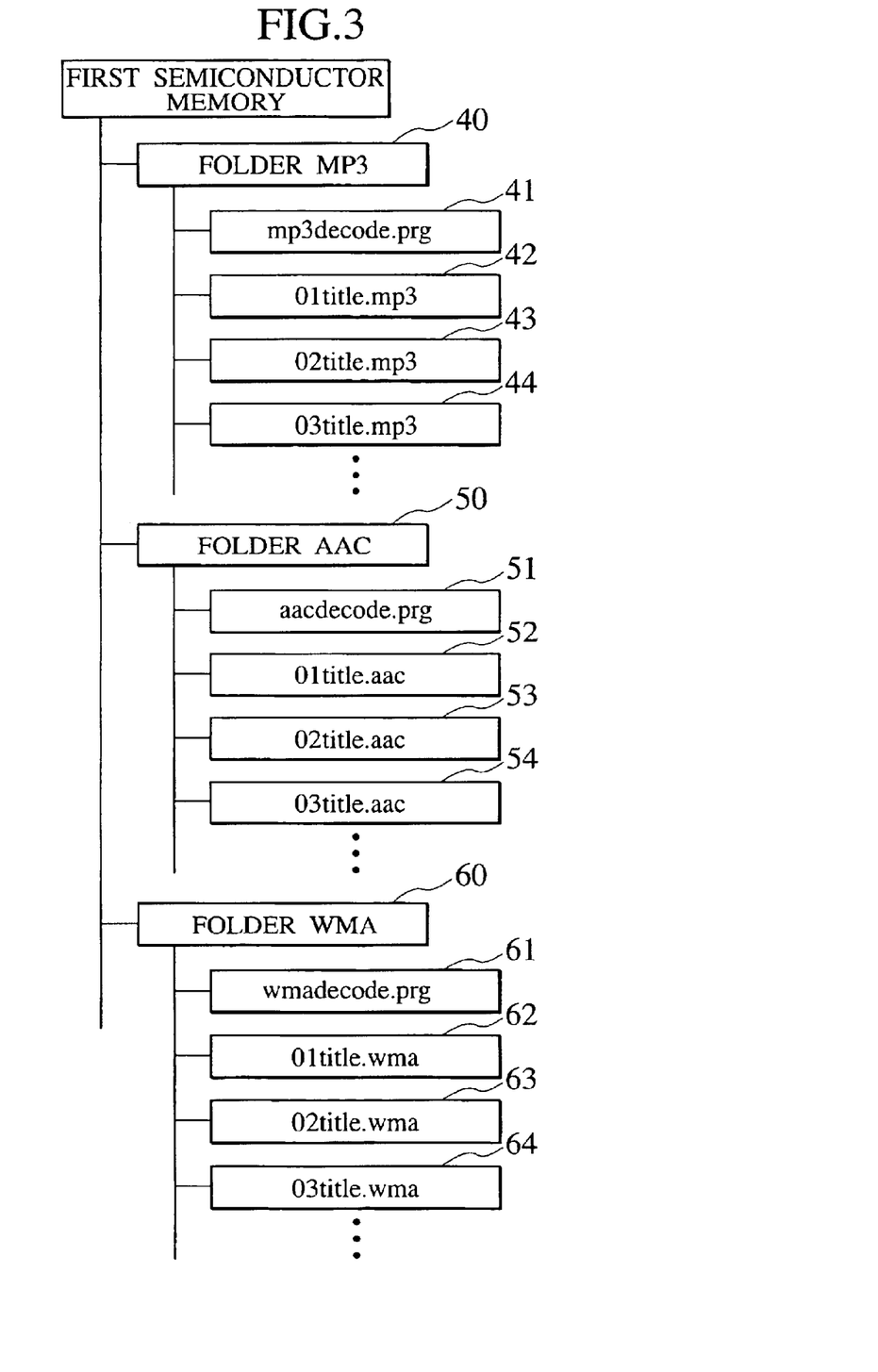
FIG. 3 is an image diagram showing an example of a file structure of information recording medium used in the portable music signal reproducing apparatus shown in FIG. 2.

In the first semiconductor memory 13, coded music data and decoding programs are recorded in as a file structure, for example, as shown in FIG. 3. In the embodiment shown in FIG. 3, folders are classified into types of coding systems, and three folders are prepared, that is, a folder 40 of MP3 system, a folder 50 of AAC system, and a folder 60 of WMA system. In each one of the folders 40, 50, 60, a coding program corresponding to the coding system, and music data coded in this coding system are stored. In the folder 40 of MP3 system, a program file 41 as file name "mp3decode.prg" stores a decoding program corresponding to the MP3 system, digital information file 42 as file name "01title.mp3" stores audio digital data coded in the MP3 system, digital information file 43 stores audio digital data coded in the MP3 system as file name "02title.mp3", digital information file 44 stores audio digital data coded in the MP3 system as file name "03title.mp3", and so forth. Similarly, the folder 50 of AAC system includes a program file 51 storing a decoding program 51 corresponding to the AAC system, and digital information files 52, 53, 54, . . . , storing audio digital data coded in the AAC system. The folder 60 of WMA system includes a program file 51 storing a decoding program 61 corresponding to the WMA system, and digital information files 62, 63, 64, . . . , storing audio digital data coded in the WMA system.

The head information of each one of these audio digital data 42, 43, 44, . . . , 52, 53, 54, . . . , and 62, 63, 64 . . . , stores the coding information indicating the audio digital data is coded in which coding system.

Figure 4:
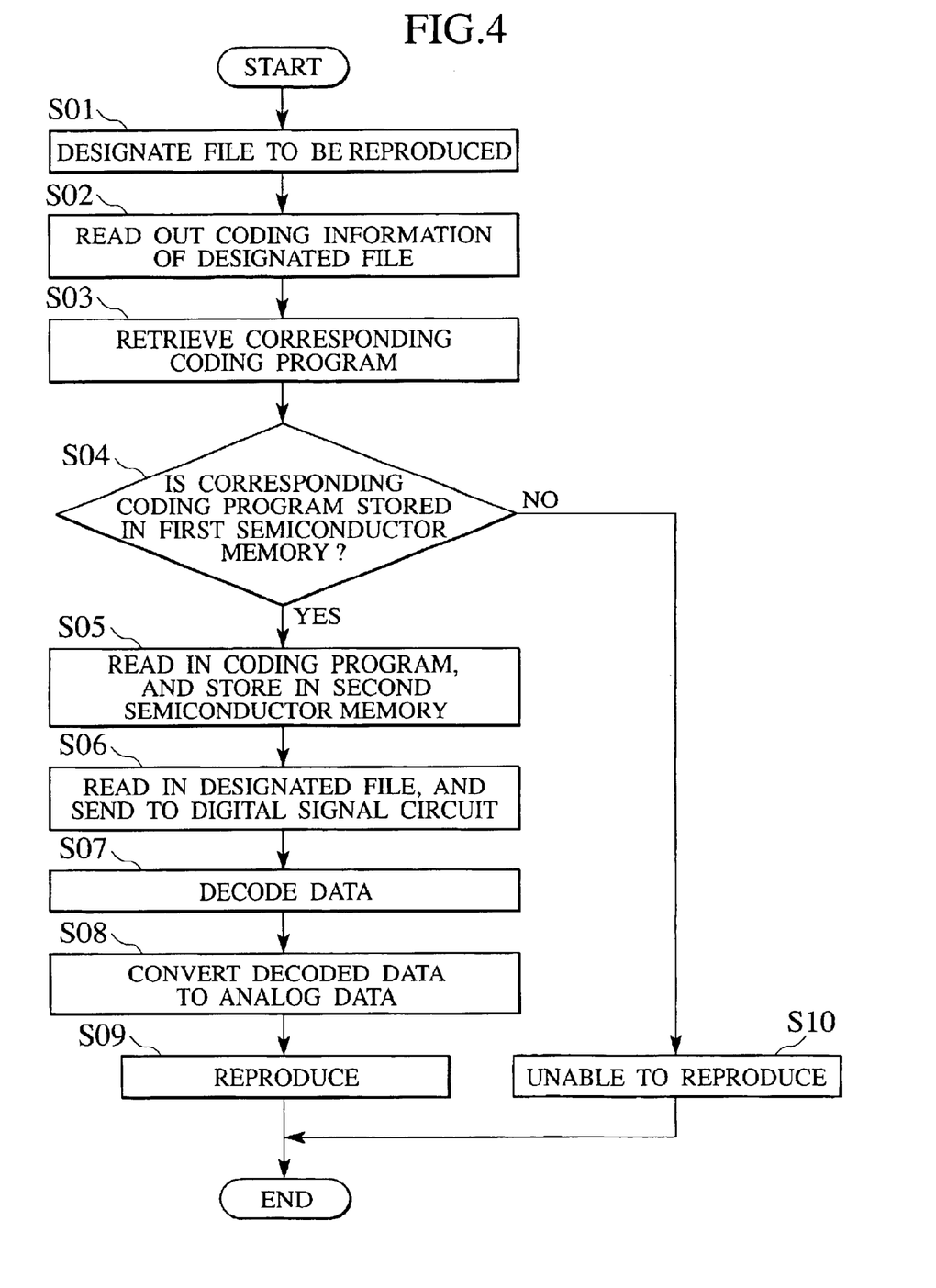
FIG. 4 is a flowchart showing an example of processing operation in the portable music signal reproducing apparatus shown in FIG. 2.

In the information reproducing apparatus of the first embodiment, the processing operation is explained below according to the flowchart shown in FIG. 4. Herein, using a portable music signal reproducing apparatus 10b shown in FIG. 5 as a model, the processing operation from designation of arbitrary music data recorded in the first semiconductor memory 13 until reproduction and output as sound from the external electric acoustic device 1 is explained. In addition to the constituent elements of the portable music signal reproducing apparatus 10a shown in FIG. 2, the portable music signal reproducing apparatus 10b shown in FIG. 5 further includes a microprocessor 17 to control the parts of the portable music signal reproducing apparatus 10b, a key input unit 18 as a user interface, and a display unit 19.

Figure 5:
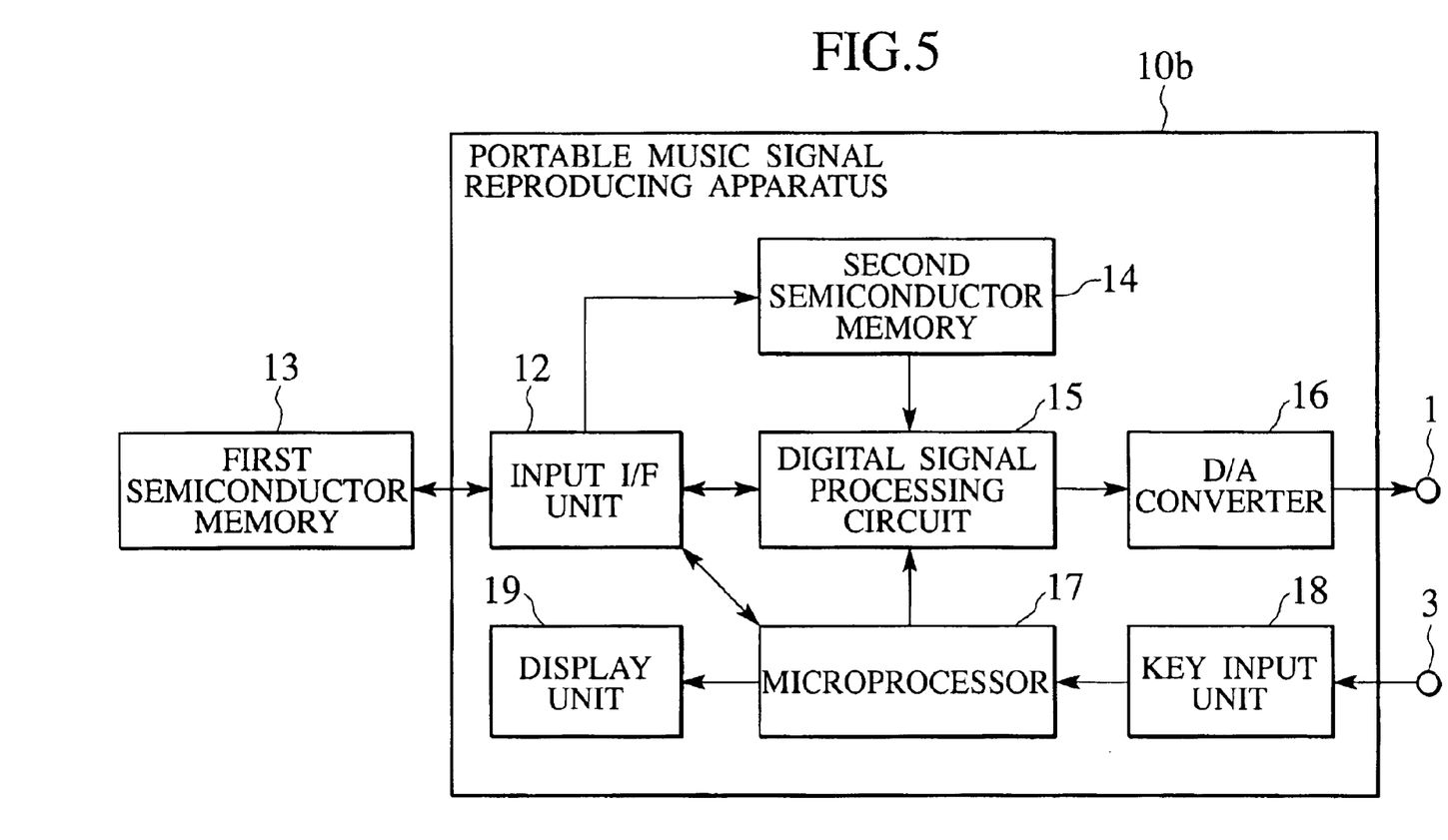
FIG. 5 is a schematic structural diagram showing another embodiment of the portable music signal reproducing apparatus in the first embodiment.

First, at step S01, when a removable first semiconductor memory 13 is inserted into the input I/F unit 12 of the portable music signal reproducing apparatus 10b, the microprocessor 17 retrieves files recorded in the first semiconductor memory 13 and displays file names of reproducible music data in the display unit 19. The user selects the desired music data (for example, audio digital data 62 of file name "01title.wma" shown in FIG. 3) from music data displayed on the display unit 19 by using the key input unit 18.

In response, at step S02, the microprocessor 17 reads the information relating to the coding system when coding designated music data, from the head information of the designated music data (in this case, audio digital data 62 of file name "01title.wma").

Next, at step S03, consequently, the microprocessor 17 designates the type of the coding system (in this case, the WMA system) from the information concerning the read out coding system and searches the coding program corresponding to this coding system from the first semiconductor memory 13.

As a result of retrieval, at step S04, if the coding program corresponding to the desired coding system is not stored in the first semiconductor memory 13, at step S10, the process is terminated by declaring that the music data selected at step S01 cannot be reproduced.

As a result of retrieval, at step S04, when the coding program corresponding to the desired coding system is stored in the first semiconductor memory 13, at step S05, the microprocessor 17 reads out the coding program corresponding to the desired coding system (in this case, WMA system decoding program 61 "wmadecode.prg") from the first semiconductor memory 13 and controls the input I/F unit 12 to store in the second semiconductor memory 14.

At step S06, the microprocessor 17 reads out the designated music data (audio digital data 62 of file name "01title.wma") from the first semiconductor memory 13 and controls the input I/F Unit 12 to send to the digital signal processing circuit 15.

At step S07, the microprocessor 17 decodes the music data sent to the digital signal processing circuit 15 (audio digital data 62 of file name "01title.wma") by the coding program stored in the second semiconductor memory 14 (WMA system decoding program 61 "wmadecode.prg").

At step S08, the decoded music data is sent to the D/A converter 16 and is converted into analog signal, and output the converted analog signal, and at step S09, the signal is delivered as sound from an external electric acoustic converter 3 of the portable music signal reproducing apparatus 10b.

As explained herein, according to the information reproducing apparatus of the first embodiment, the decoding program describing the decoding algorithm to decode the digital information is recorded in the same recording medium as the information recording medium recording the digital information coded in the predetermined coding system. The information reproducing apparatus, when reproducing the digital information, can decode and reproduce the digital signal by the decoding program read out from the information recording medium. That is, if a new coding system is developed, only by recording the decoding program corresponding to this coding system in the same recording medium as the information recording medium recording the coded digital information, this information reproducing apparatus can reproduce the digital information by decoding according to the new system.

If desired to be applicable to plural types of coding systems, the decoding program can be obtained from the information recording medium at the time of reproduction of digital information by recording the plural types of decoding programs in the same recording medium as the information recording medium recording the digital information. Therefore, unlike the general information reproducing apparatus, it does not require semiconductor memories of large capacity or expensive flash memories or semiconductor memories to store plural types of decoding programs. Further, to obtain the decoding program, it is not required to connect to a personal computer or other external device. Therefore, it is flexibly applicable to various coding systems, and the manufacturing cost of the information reproducing apparatus can be also curtailed.

Second Embodiment

Figure 6:
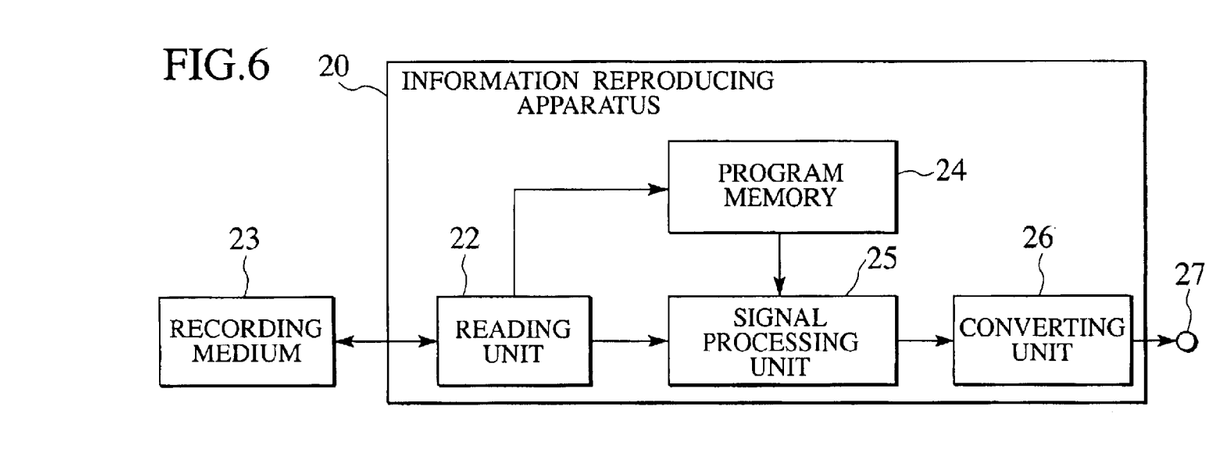
FIG. 6 is a schematic structural diagram showing an embodiment of an information reproducing apparatus in a second embodiment.

As shown in FIG. 6, an information reproducing apparatus 20 in a second embodiment includes a reading unit 22, a program memory 24, a signal processing unit 25, and a conversion unit 26. The reading unit 22 reads out from a recording medium 23. Digital information preliminarily coded in a predetermined coding system and a decoding program to decode the coded digital information in the predetermined coding system are recorded in the information recording medium 23. The program memory 24 stores the decoding program read out from the reading unit 22. The signal processing unit 25 decodes the digital information read out from the reading unit 22 according to the decoding algorithm of the decoding program stored in the program memory 24. The conversion unit 26 converts the digital information decoded in the signal processing unit 25 into a predetermined output format.

Herein, the "digital information" refers to digitized information for example, of text, audio, still image, and moving image, and the digital information can be digitally processed by transmission, accumulation or reproduction, for example, as multi-channel audio signal, video signal of the National Television System Committee (NTSC) system or the video signal of Phase Alternation by Line color television (PAL) system, either alone or in combination.

The information recording medium 23 includes a removable recording medium making use of a semiconductor memory, a magnetic recording medium, an optical recording medium, and various recording media. Examples of the removable recording medium of the semiconductor memory include a smart media, a flash memory card, a compact flash memory, a secure digital memory card (SD memory card), a small PC card, a memory stick and the like. Examples of the magnetic recording medium include a flexible disk and a removable hard disk. Examples of the optical recording medium include a compact-disc read-only memory (CD-ROM), a CD-Recordable (CD-R), a CD-ReWritable (CD-RW), a digital versatile disk read only memory (DVD-ROM), a DVD random access memory (DVD-RAM), a mini disc (MD) and the like. The memory card making use of semiconductor memory is presented at a relatively low cost at a large capacity (more than tens of Mbytes). Concerning the optical recording medium, the medium itself is inexpensive, and the CD-R can record about 650 Mbytes in a piece, and the DVD-RAM can record about several Mbytes to tens of Gbytes in a piece, and the capacity is large enough to record plural types of decoding programs together with digital information.

The user loads a removable information recording medium 23 into the reading unit 22 of the information reproducing apparatus 20 and designates the digital information desired to be reproduced from the digital information recorded in the information recording medium 23. The reading unit 22 reads out the decoding program to decode the designated digital information from the information recording medium 23 and stores the read out decoding program in the program memory 24.

The reading unit 22 reads out the designated digital information from the information recording medium 23 and sends the designated digital information to the signal processing unit 25.

The signal processing unit 25 decodes the transmitted digital information by using the decoding program stored in the program memory 24 and sends the decoded digital information to the conversion unit 26.

The conversion unit 26 outputs the decoded digital information as information signal in predetermined format. The output format includes the formats conforming to the multi-channel analog audio signal, or the analog video signal the NTSC system or the PAL system as mentioned above. Besides the analog video signal, in the digital data output format conforming to the Digital Visual Interface (DVI) standard, the information may be also issued to an external display device such as a liquid crystal display (LCD) or a cathode ray tube (CRT) having the DVI input terminal and converted into an analog signal at the external display device side and displayed.

Figure 7:
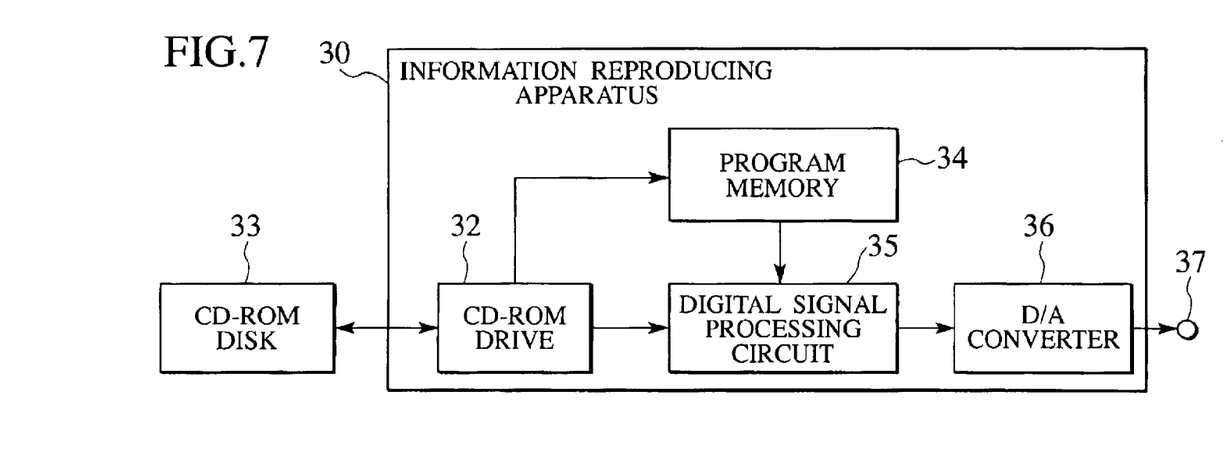
FIG. 7 is a schematic structural diagram showing a structural embodiment using CD-ROM as information recording medium in the information reproducing apparatus shown in FIG. 6.

An example of an information reproducing apparatus 30 using an optical recording medium such as CD-ROM disc is shown. As shown in FIG. 7, the information reproducing apparatus 30 includes a CD-ROM drive 32, a program memory 34, a digital signal processing circuit 35, and a D/A converter 36. The CD-ROM drive 32 reads out from the CD-ROM disk 33, an optical recording medium. The CD-ROM disk 33 has a file structure as shown in FIG. 3 and stores plural files of decoded audio signal data and corresponding decoding programs. The optical recording medium includes, besides the CD-ROM for read-only use, the CD-R capable of writing data only once, the CD-RW capable of erasing and rewriting data repeatedly, and the DVD-ROM and the DVD-RAM of a larger capacity. The program memory 34 stores the decoding program read out from the CD-ROM drive 32. The digital signal processing circuit 35 decodes the digital information read out from the CD-ROM drive 32 by the decoding algorithm of the decoding program stored in the program memory 34. The D/A converter 36 converts the digital information decoded by the digital signal processing circuit 35 into a predetermined output format.

The user loads the CD-ROM disk 33 into the CD-ROM drive 32 of the information signal reproducing apparatus 30 and designates the music information to be reproduced from the digital information recorded in the CD-ROM disk 33. The CD-ROM drive 32 reads out the decoding program to decode the designated music information from the CD-ROM disk 33, and stores the fetched decoding program in the program memory 34.

The CD-ROM drive 32 reads out the designated music information from the CD-ROM disk 33 and sends the designated music information to the digital signal processing circuit 35.

The digital signal processing circuit 35 decodes the transmitted music signal by using the decoding program stored in the program memory 34 and sends the decoded music information to the D/A converter 36.

The D/A converter 36 issues the decoded music signal as analog audio signal in a predetermined format, and the issued analog audio signal is delivered as sounds from an external electric acoustic converter 3 such as headphones.

Generally, an optical recording medium is very large in recording capacity as compared with a semiconductor memory card or the like, and the optical recording medium can be used for a reproducing device of not only music information, but also video information or combined information of audio information and video information. The coding system of moving image has been also developed in various systems, and, for example, widely employed coding systems include Moving Picture Experts Group phase 1 (MPEG1), Moving Picture Experts Group phase 2 (MPEG2), Moving Picture Experts Group phase 4 (MPEG4), and Windows Media Video (WMV).

Hitherto, a reproducing apparatus exclusively conforming to a specific coding system (for example, the reproducing apparatus exclusive for a Video-CD format recording moving image digital data of the MPEG1 system in CD-ROM) could not reproduce moving image digital data coded in a different coding system (for example, the MPEG4 or the WMV system).

In contrast, according to the information reproducing apparatus of the second embodiment, only by recording the decoding programs corresponding to various coding systems such as MPEG1, MPEG2, MPEG3, WMV, etc. in the CD-ROM disk 33 to record digital information, it is designed to be applicable to plural coding systems or a new coding system easily and flexibly.

The information reproducing apparatus of the second embodiment is not limited to the apparatus for reproducing music or video only, but it is also applied as information reproducing apparatus for reproducing and issuing data contents in a wide field such as electronic book, electronic dictionary, electronic map, and electronic game.

Third Embodiment

In the information reproducing apparatus explained in the first and second embodiments, the decoding program must be recorded in the information recording medium in which the digital information is recorded. Accordingly, when this information reproducing apparatus is transferred or leased to the user, whether free of charge or not, the decoding program is also recorded as an electronic file in the recording medium such as flexible disk, CD-ROM or memory card, and this recording medium is attached to the information reproducing apparatus and presented to the user.

A third embodiment relates to an information recording apparatus 70a for recording a decoding program from a presented recording medium in which an electronic file of decoding program is recorded, into an information recording medium in which digital information is recorded.

Figure 8:
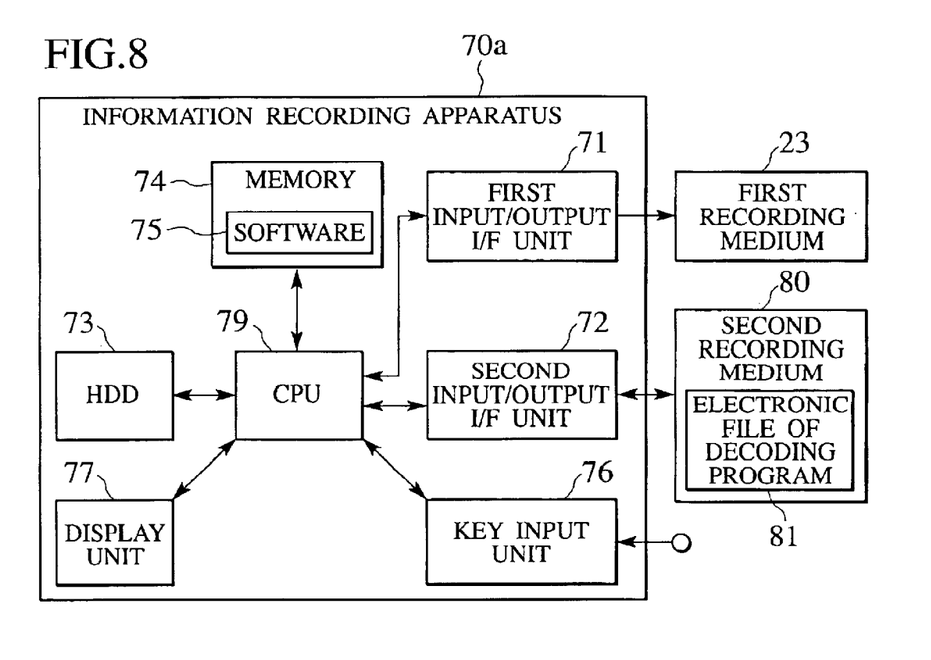
FIG. 8 is a schematic structural diagram showing an embodiment of an information recording apparatus in a third embodiment.

The information recording apparatus 70a may be realized, for example, by a personal computer. The information recording apparatus 70a includes, as shown in FIG. 8, a central processing unit (CPU) 79, a first input/output interface (I/F) unit 71, a second input/output interface (I/F) unit 72, a hard disk drive (HDD) 73, a memory 74, a key input unit 76, and a display unit 77. The memory 74 is a program memory to store software 75 including a file management function which operates on this information recording apparatus 70. The CPU 79 is a control unit to control the parts according to the processing procedure predetermined in the software 75. The first input/output I/F unit 71 is a first input/output unit to input and output a first recording medium 23, recording the digital information coded in a specific coding system. The second input/output I/F unit 72 is a second input and output unit to input and output a second recording medium 80 storing the decoding program which decodes the digital information.

The user connects the second recording medium 80 storing an electronic file 81 of decoding program to the second input/output I/F unit 72. Using the software 75 stored in the memory 74, the electronic file 81 of the decoding program stored in the second recording medium 80 is read out, and the read out electronic file 81 is once recorded in the HDD 73. When recording digital information such as video or audio in the first recording medium 23, the electronic file 81 of the decoding program recorded in the HDD 73 is also recorded in the first recording medium 23 through the first input/output I/F unit 71.

This process can be realized by using, for example, a shell program having a file management function as the software 75 in the memory 74, and giving proper instructions by the user from the key input unit 76 according to the information displayed in the display unit 77 by the shell program. Thus, the first recording medium 23 recording the digital information such as video and audio and the decoding program is detached from the first input/output I/F unit 71, and the detached first recording medium 23 is connected to the information reproducing apparatus in the first or second embodiment, so that digital information may be decoded and reproduced.

Fourth Embodiment

However, if the user is obliged to record the decoding program in the information recording medium in which digital information is recorded, for reproducing in the information reproducing apparatus, the user may forget to record the decoding program or fail to record correctly, and the digital information recorded in the information recording medium may be always reproduced correctly.

Therefore, when transferring or leasing the information recording apparatus to the user, whether free of charge or not, the electronic file of decoding program and recording software are recorded in the recording medium, and this recording medium is attached to the information reproducing apparatus and presented to the user. In this recording software, the information recording program is stored.

Figure 9:
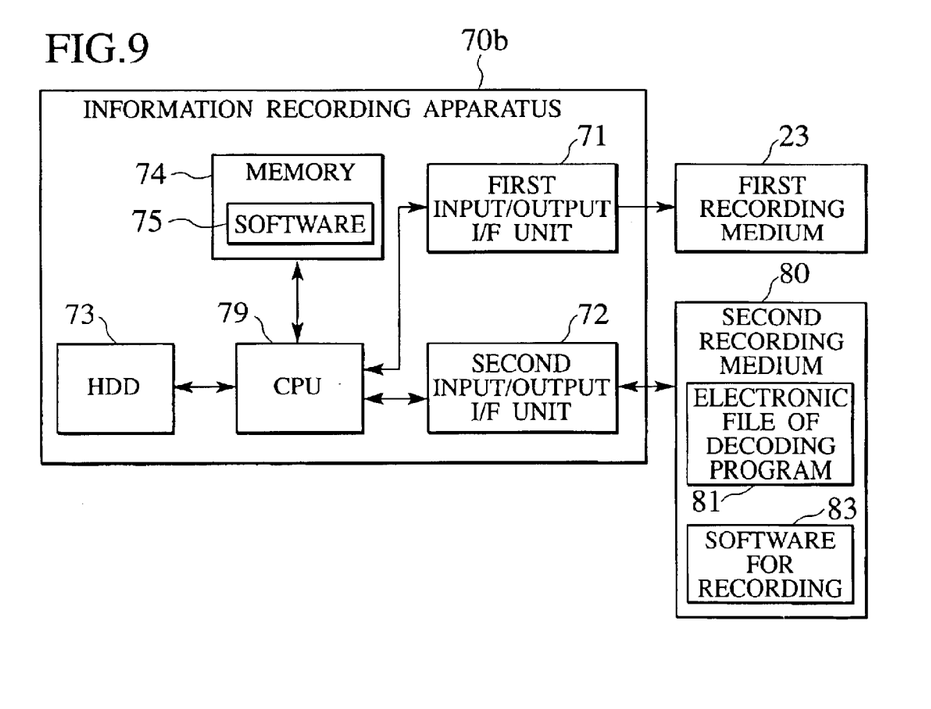
FIG. 9 is a schematic structural diagram showing an embodiment of an information recording apparatus in a fourth embodiment.

An information recording apparatus 70b in a fourth embodiment includes, as shown in FIG. 9, a central processing unit (CPU) 79, a first input/output interface (I/F) unit 71, a second input/output interface (I/F) unit 72, a hard disk drive (HDD) 73, a memory 74, and a key input unit 76.

In the HDD 73, digital information of video and audio preliminarily coded in a specific coding system is recorded. In a second recording medium 80, an electronic file 81 of decoding program to decode the digital information, and recording software 83 to record the digital data in a first recording medium 23 are stored.

The user connects the second recording medium 80 storing the decoding program and the recording software 83 to the second input/output I/F unit 72. Reading out the recording software 83 recorded in the second recording medium 80, it is recorded in the memory 74, and further the electronic file 81 of the decoding program recorded in the second recording medium 80 is read out, and it is once recorded in the HDD 73.

Figure 10:
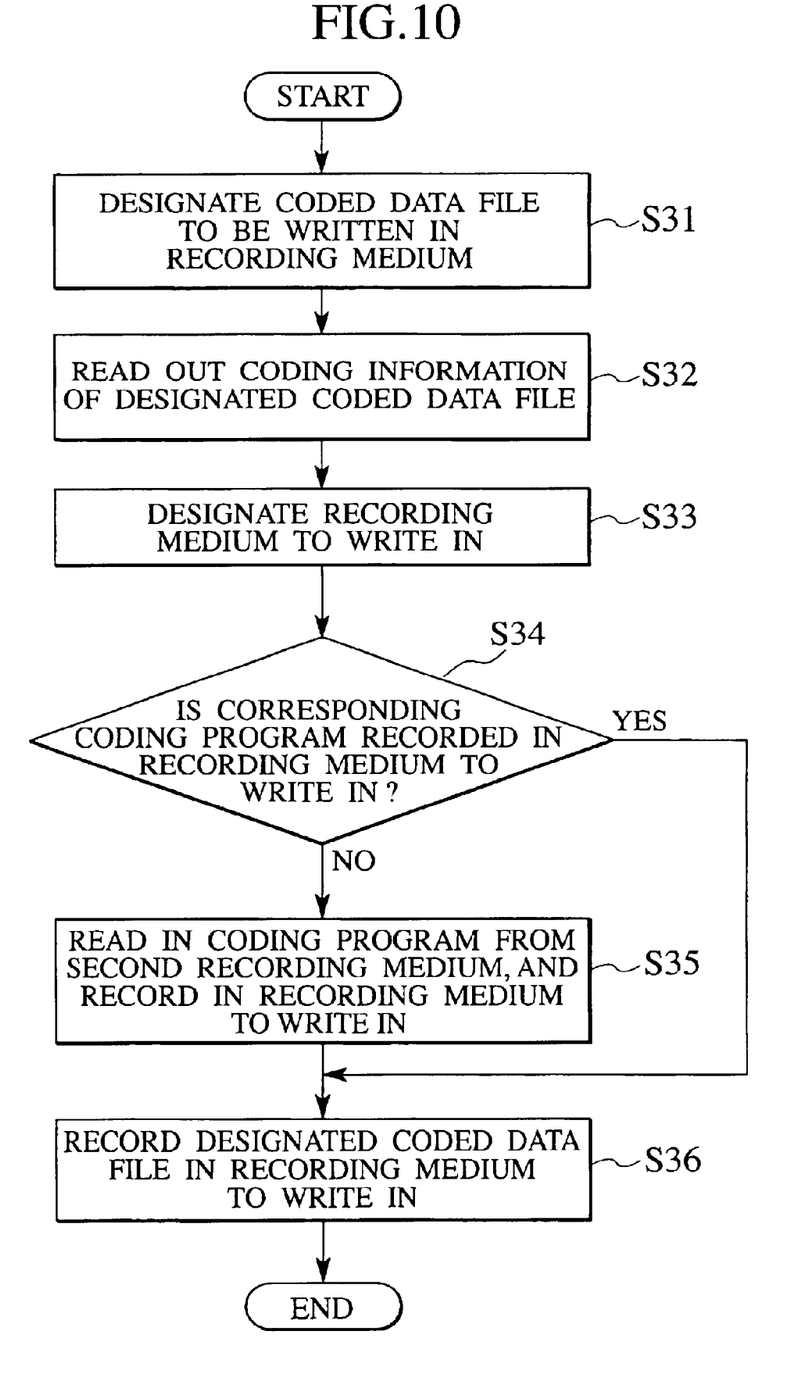
FIG. 10 is a flowchart showing an example of processing procedure of an information recording program operating in the information recording apparatus shown in FIG. 9.

The CPU 79 of the information recording apparatus 70b controls the process as shown in FIG. 10 according to the processing procedure predetermined in the recording software 83 recorded in the memory 74.

First, at step S31, the user designates the digital information to be recorded in the first recording medium 23 by selecting from the coded digital information recorded in the HDD 73.

At step S32, the CPU 79 of the information recording apparatus 70b reads out the coding information indicating which coding system is used when coding, stored in the header information of designated digital information, and the CPU 79 specifies the coding system used when the digital information is coded.

At step S33, the user designates the medium for recording the digital information. For example, the SD memory card or CD-R is predetermined in the first recording medium 23.

At step S34, the CPU 79 of the information recording apparatus 70b checks if the decoding program corresponding to the coding system designated at step S32 is recorded in the predetermined first recording medium 23 or not.

As a result of checking, if the decoding program corresponding to the designated coding system is not recorded in the predetermined first recording medium 23, at step S35, the CPU 79 of the information recording apparatus 70b reads out the decoding program corresponding to the designated coding system from the HDD 73 and records the read out decoding program in the predetermined first recording medium 23.

On the other hand, as a result of checking at step S34, when the corresponding decoding program is recorded in the predetermined first recording medium 23, the process of step S35 is skipped.

Next, at step S36, the CPU 79 of the information recording apparatus 70b reads out the digital information designated at step S31 from the HDD 73 and records the read out digital information in the predetermined first recording medium 23.

Thus, according to the fourth embodiment, by recording the electronic file 81 of decoding program and recording software 83 in the second recording medium 80, the second recording medium 80 is attached to the information reproducing apparatus of the first and second embodiments and presented to the user. The user, using the information recording apparatus 70b, can record the decoding program easily and correctly in the first recording medium 23 in which digital information is recorded, from the second recording medium 80 recording the electronic file 81 of decoding program and recording software 83. Therefore, the completed first recording medium 23 can be reproduced in the information reproducing apparatus of the first and second embodiments.

It hence prevents troubles such as failure of reproduction of digital information recorded in the information recording medium due to the neglected or incorrect recording of decoding program.

Fifth Embodiment

In the second recording medium 80 explained in the fourth embodiment, further, the coding software to code the digital information may be stored and the information reproducing apparatus may be transferred or leased to the user, and in such a case the second recording medium may be attached to the information reproducing apparatus and presented to the user.

Thus, for example, uncoded digital information possessed by the user can be also coded by the coding software and recorded in the first recording medium, and by connecting the first recording medium to the information reproducing apparatus of the first or second embodiment, the digital information can be reproduced.

Figure 11:
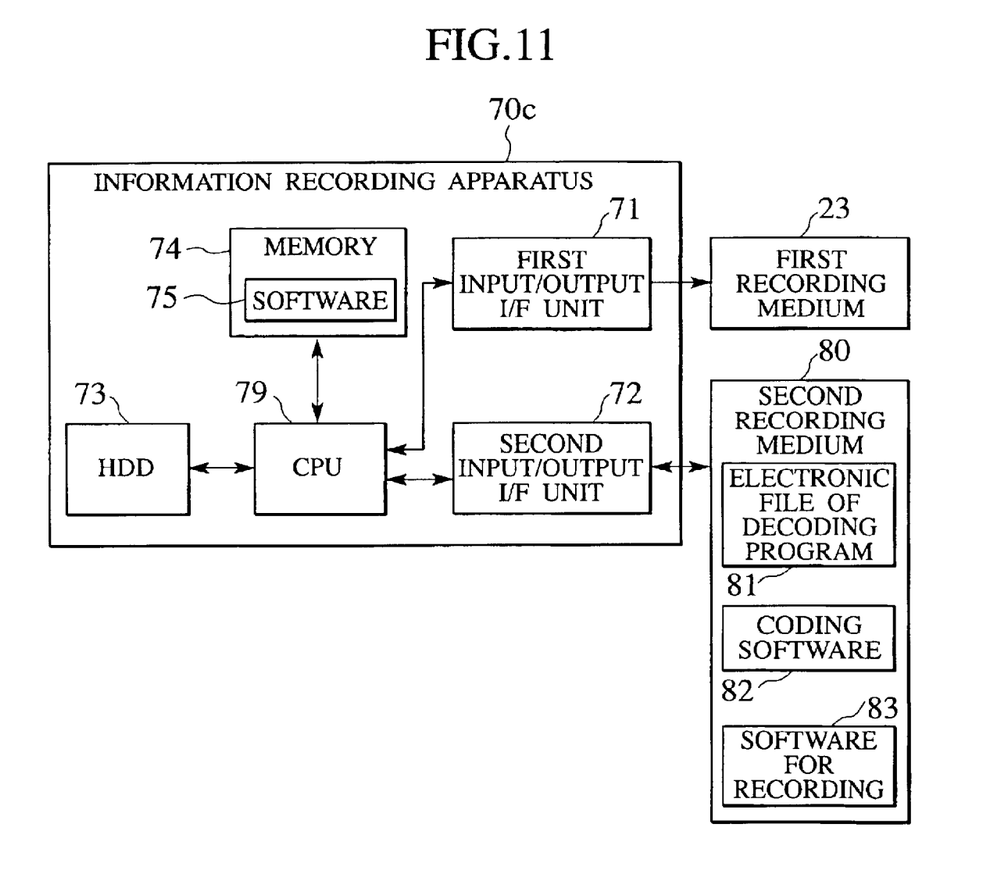
FIG. 11 is a schematic structural diagram showing an embodiment of an information recording apparatus in a fifth embodiment.

An information recording apparatus 70c in a fifth embodiment includes, as shown in FIG. 11, a central processing unit (CPU) 79, a first input/output interface (I/F) unit 71, a second input/output interface (I/F) unit 72, a hard disk drive (HDD) 73, and a memory 74. In the HDD 73, digital information of video and audio preliminarily coded in a specific coding system is recorded. In a second recording medium 80, an electronic file 81 of decoding program to decode the digital information, recording software 83 to record the digital data in a first recording medium 23, and coding software 82 are stored.

The user inserts the second recording medium 80 to the second input/output I/F unit 72 to readout the recording software 83 recorded in the second recording medium 80 to store in the memory 74. Further, the electronic file 81 of the decoding program recorded in the second recording medium 80 is read out, and the read out decoding program is once recorded in the HDD 73.

Figure 12:
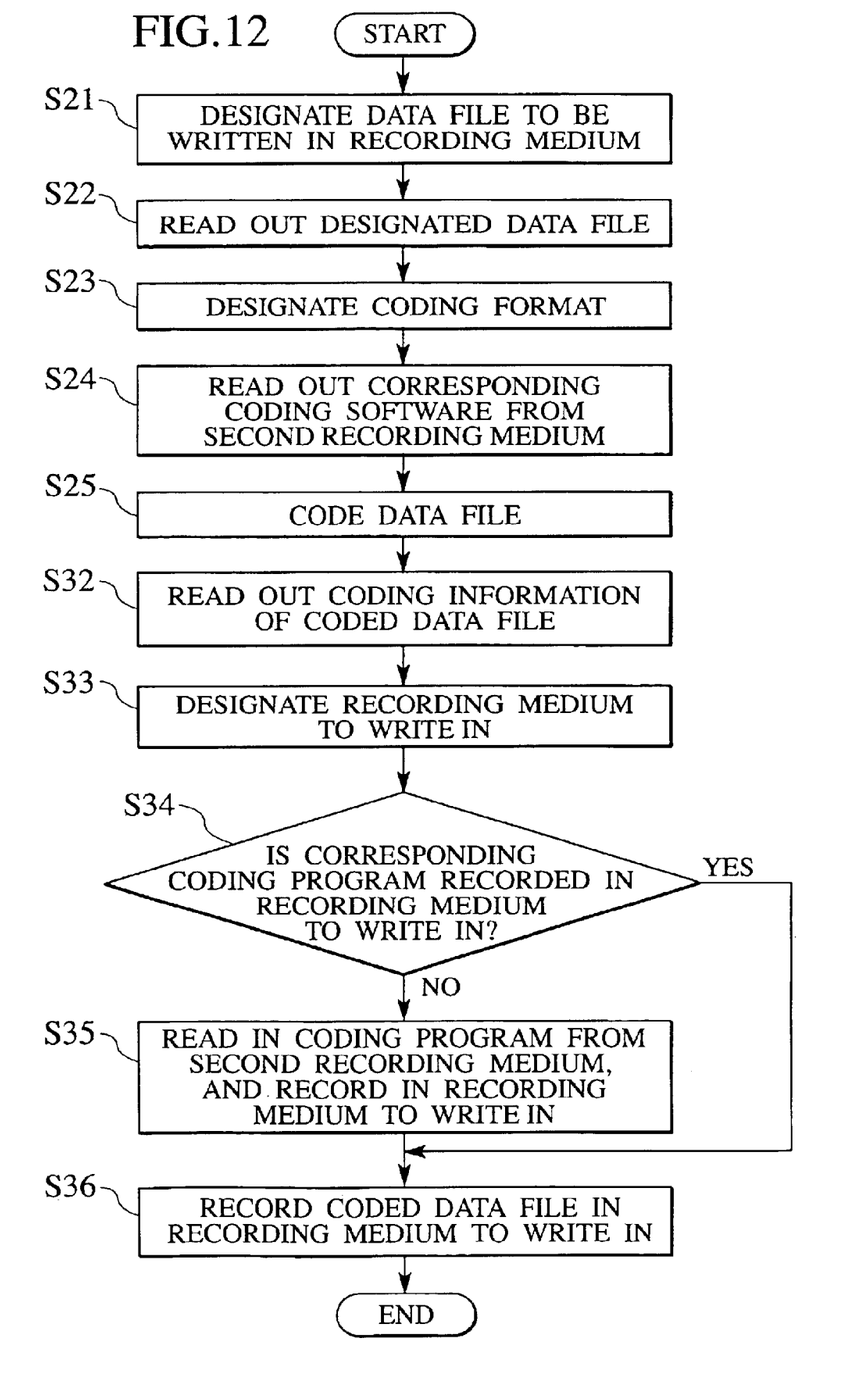
FIG. 12 is a flowchart showing an example of processing procedure of an information recording program operating in the information recording apparatus shown in FIG. 11.

The CPU 79 of the information recording apparatus 70c controls the process as shown in FIG. 12 according to the processing procedure predetermined in the recording software 83 stored in the memory 74.

First, at step S21, the user designates the digital information to be recorded in the first recording medium 23 after coding process, by selecting from the coded digital information recorded in the HDD 73.

At step S22, the CPU 79 of the information recording apparatus 70c reads out the designated digital information from the HDD 73.

At step S23, for example, the user designates the coding system to code the designated digital information such as MP3 or WMA.

At step S24, the CPU 79 of the information recording apparatus 70c reads out coding software 82 corresponding to the designated coding system from the second recording medium 80, and at step S25, the digital information read out at step S22 is coded using the coding software 82 read out.

The subsequent processing procedure from step S32 to step S36 is same as the processing procedure from step S32 to step S36 shown in FIG. 10 in the fourth embodiment.

At step S32, the CPU 79 of the information recording apparatus 70c reads out the coding information stored in the header information of designated digital information, and the CPU 79 specifies the coding system used when the digital information is coded.

At step S33, the user designates the medium for recording the digital information.

At step S34, the CPU 79 of the information recording apparatus 70c checks if the decoding program corresponding to the coding system designated at step S32 is recorded in the predetermined first recording medium 23 or not.

As a result of checking, if the decoding program corresponding to the designated coding system is not recorded in the predetermined first recording medium 23, at step S35, the CPU 79 of the information recording apparatus 70b reads out the decoding program corresponding to the designated coding system from the HDD 73 and records the read out decoding program in the predetermined first recording medium 23.

Next, at step S36, the CPU 79 of the information recording apparatus 70c reads out the digital information designated at step S31 from the HDD 73 and records the read out digital information in the predetermined first recording medium 23.

Thus, for example, even the uncoded digital information possessed by the user can be recorded in the first recording medium 23 by the coding software 82. By connecting the first recording medium to the information reproducing apparatus of the first or second embodiment, this digital information can be reproduced.

In FIG. 12, meanwhile, if the digital information designated at step S21 has been already coded in the predetermined coding system, the procedure from step S22 to step S25 can be skipped.

In the third to fifth embodiments, the user handles the information recording apparatus and information recording program, but the information recording apparatus and information recording program can be used by the provider of the digital information, such as a record company or a movie company, when producing the CD software, DVD software, or other information recording media. Further, by installing the information recording apparatus at a record shop or a convenience store, it can create new business of recording decoding program in the information recording medium when a new coding system is developed.

Moreover, when the information recording program in the fourth or fifth embodiments is attached to the information reproducing apparatus in the first or second embodiment, it can be transferred or leased, whether free of charge or not, to the user. When a new coding system is invented, the information recording program and decoding program (and coding program) can be recorded in a computer-readable recording medium, and by transferring or leasing the recording medium to the user, a new business of after-sale service to the user may be established.

Although the embodiments of the present invention have been described in detail, the invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for reproducing digital information coded in a coding system, both the digital information and a decoding computer program being recorded in an information recording medium, the decoding computer program describing a decoding algorithm to decode the digital information, the apparatus comprising:

a reading unit configured to read out the coded digital information recorded in the information recording medium and to read out the decoding computer program recorded in the information recording medium in which the digital information is recorded;

a program memory configured to store the decoding computer program read out from the reading unit;

a signal processing unit configured to decode the digital information read out from the reading unit using the decoding algorithm of the decoding computer program stored in the program memory; and a conversion unit configured to convert the digital information decoded in the signal processing unit into a predetermined format, and to output the converted digital information, wherein when plural pieces of digital information coded in different coding systems and plural types of decoding computer programs for decoding the coded digital information are recorded in a same information recording medium, said reading unit (1) reads out coding information of the digital information from digital information selected by a user from among the plural pieces of digital information recorded in the information recording medium, the coding information for identifying the coding system when coding the digital information selected by the user, (2) selectively reads out a decoding computer program for decoding the digital information from among the plural types of the decoding computer programs recorded in the information recording medium, the read decoding computer program corresponding to the coding system identified by the read coding information, and (3) stores the decoding computer program read out in the program memory.

2. An information recording medium recording digital information to be reproduced by an information reproducing apparatus according to claim 1, the information recording medium comprising:

a digital information file storing the digital information coded in a predetermined coding system, the digital information including coding information for identifying the coding system when coding the digital information; and a program file storing a decoding computer program describing a decoding algorithm to decode the coded digital information stored in the digital information file, the decoding computer program corresponding to the coding system identified by the coding information.

3. The information recording medium of claim 2, wherein said information recording medium is a semiconductor memory.

4. The information recording medium of claim 2, wherein said information recording medium is a magnetic recording medium.

5. The information recording medium of claim 2, wherein said information recording medium is an optical recording medium.

6. The apparatus of claim 1, wherein said program memory is a volatile memory.

7. The apparatus of claim 1, wherein said conversion unit converts the decoded digital information into a multi-channel audio signal.

8. The apparatus of claim 1, wherein said conversion unit converts the decoded digital information into a multi-channel audio signal and a NTSC system video signal.

9. The apparatus of claim 1, wherein said conversion unit converts the decoded digital information into a multi-channel audio signal and a PAL system video signal.

10. A method for reproducing digital information, the method comprising:

reading out coding information included in the digital information to be reproduced from an information recording medium in which both of the digital information coded in a predetermined coding system and a decoding computer program describing a decoding algorithm to decode the coded digital signal are recorded together;

reading out the decoding computer program corresponding to the coding system identified by the coding information read out from the information recording medium in which the digital information is recorded;

storing the read out decoding computer program to a program memory;

reading out the digital information to be reproduced from the information recording medium;

decoding the digital information read out by the decoding algorithm of the stored decoding computer program; and converting the decoded digital information into a predetermined format, and reproducing the converted digital information, and wherein when plural pieces of digital information coded in different coding systems and plural types of decoding computer programs for decoding the coded digital information are recorded in a same information recording medium, the coding information of the digital information is read out from digital information selected by a user from among the plural pieces of digital information recorded in the information recording medium, and a decoding computer program for decoding the digital information is selectively read out from among the plural types of the decoding computer programs recorded in the information recording medium, the read decoding computer program corresponding to the coding system identified by the read coding information, and the read out decoding computer program is stored in the program memory.

11. An apparatus for recording both digital information coded in a coding system and a decoding computer program describing a decoding algorithm to decode the digital information in a first recording medium, the decoding computer program and recording software to record the digital information in the first recording medium being recorded in a second recording medium, the apparatus comprising:

a first input/output unit configured to input from and output to the first recording medium;

a second input/output unit configured to input from and output to the second recording medium;

a program memory configured to store the recording software in the second recording medium through the second input/output unit; and a control unit configured (1) to read out coding information from the digital information, (2) to judge whether the decoding computer program corresponding to the coding information read out is recorded in the first recording medium through the first input/output unit, (3) to read out the decoding computer program corresponding to the coding information from the second recording medium through the second input/output unit and to record the decoding computer program read out in the first recording medium through the first input/output unit only when the decoding computer program is not recorded in the first recording medium, and (4) to record the digital information in the first recording medium in which the decoding computer program is recorded through the first input/output unit, according to a processing procedure predetermined in the recording software stored in the program memory.

12. The apparatus of claim 11, wherein said second recording medium records the decoding computer program, the recording software, and coding software to code the digital signal in the predetermined coding system; and said control unit reads out the coding software from the second recording medium through the second input/output unit, codes uncoded digital information by the coding software read out, reads out the coding information from the coded digital information, judges whether the decoding computer program corresponding to the coding information read out is recorded in the first recording medium through the first input/output unit, reads out the decoding computer program corresponding to the coding information from the second recording medium through the second input/output unit and records the decoding computer program read out in the first recording medium through the first input/output unit only when the decoding computer program is not recorded in the first recording medium, and records the digital information in the first recording medium in which the decoding computer program is recorded through the first input/output unit.

13. A method of recording digital information coded in a predetermined coding system in a first recording medium, the method comprising:

reading out coding information from the digital information;

judging whether a decoding computer program corresponding to the coding information read out is recorded in the first recording medium;

reading out the decoding computer program corresponding to the coding information from a second recording medium and recording the decoding computer program read out in the first recording medium only when the decoding computer program is not recorded in the first recording medium; and recording the digital information in the first recording medium in which the decoding computer program is recorded.

14. A method of recording digital information in a first recording medium, the method comprising:

reading out a coding software to code the digital information from a second recording medium;

coding the digital information by the coding software read out in a coding system;

reading out coding information from the coded digital information;

judging whether the coding program corresponding to the coding information read out is recorded in the first recording medium;

reading out the decoding computer program corresponding to the coding information from the second recording medium and recording the decoding computer program read out in the first recording medium only when the decoding computer program is not recorded in the first recording medium; and recording the digital information in the first recording medium in which the decoding computer program is recorded.

15. A computer readable recording medium storing a program for recording digital information coded in a predetermined coding system in a first recording medium, the program comprising:

reading out coding information from the digital information;

judging whether a decoding computer program corresponding to the coding information read out is recorded in the first recording medium;

reading out the decoding computer program corresponding to the coding information from the second recording medium and recording the decoding computer program read out in the first recording medium only when the decoding computer program is not recorded in the first recording medium; and recording the digital information in the first recording medium in which the decoding computer program is recorded.

16. A computer readable recording medium storing a program for recording digital information in a first recording medium, the program comprising:

reading out coding software to code the digital information from a second recording medium;

coding the digital information by the coding software read out;

reading out coding information from the coded digital information;

judging whether a decoding computer program corresponding to the coding information read out is recorded in the first recording medium;

reading out the decoding computer program corresponding to the coding information from the second recording medium and recording the decoding computer program read out in the first recording medium only when the decoding computer program is not recorded in the first recording medium; and recording the digital information in the first recording medium in which the decoding computer program is recorded.

* * * * *